US011457627B2

(12) United States Patent
Ohno et al.

(10) Patent No.: US 11,457,627 B2
(45) Date of Patent: Oct. 4, 2022

(54) PLANT ACTIVATOR

(71) Applicant: IBIDEN CO., LTD., Gifu (JP)

(72) Inventors: Katsuya Ohno, Gifu (JP); Tomohiro Nohara, Gifu (JP); Teruaki Yokota, Gifu (JP)

(73) Assignee: IBIDEN CO., LTD., Gifu (JP)

(*) Notice: Subject to any disclaimer, the term of this patent is extended or adjusted under 35 U.S.C. 154(b) by 319 days.

(21) Appl. No.: 16/493,150

(22) PCT Filed: Mar. 13, 2018

(86) PCT No.: PCT/JP2018/009763
§ 371 (c)(1),
(2) Date: Sep. 11, 2019

(87) PCT Pub. No.: WO2018/168860
PCT Pub. Date: Sep. 20, 2018

(65) Prior Publication Data

US 2021/0282398 A1 Sep. 16, 2021

(30) Foreign Application Priority Data

Mar. 14, 2017 (JP) ............................ JP2017-048722

(51) Int. Cl.
*A01N 37/42* (2006.01)

(52) U.S. Cl.
CPC .................................. *A01N 37/42* (2013.01)

(58) Field of Classification Search
CPC .................................................... A01N 37/42
See application file for complete search history.

(56) References Cited

U.S. PATENT DOCUMENTS

| | | | |
|---|---|---|---|
| 6,987,130 | B1 | 1/2006 | Yokoyama et al. |
| 2009/0076309 | A1 | 3/2009 | Yokoyama et al. |

(Continued)

FOREIGN PATENT DOCUMENTS

| | | | |
|---|---|---|---|
| CN | 1370045 | A | 9/2002 |
| CN | 101056840 | A | 10/2007 |
| CN | 102497780 | A | 6/2012 |

(Continued)

OTHER PUBLICATIONS

Vollenweider et al, Fatty acid ketodienes and fatty acid ketotrienes: Michael addition acceptors that accumulate in wounded and diseased *Arabidopsis* leaves, 2000, The Plant Journal, 24(4), pp. 467-476. (Year: 2000).*

(Continued)

*Primary Examiner* — Trevor Love
(74) *Attorney, Agent, or Firm* — Ware, Fressola, Maguire & Barber LLP

(57) ABSTRACT

The objective of the invention is to provide a plant activator with superior resistance-inducing activity and low toxicity and soil contamination. A plant activator comprising, as an active ingredient, an oxo fatty acid derivative of general formula (I):

$$HOOC—(R^1)—C{=}C—C({=}O)—R^2 \quad (I)$$

(wherein, $R^1$ is a straight or branched alkyl group with 6 to 12 carbon atoms, and optionally comprises one or more double bonds, $R^2$ is an alkyl group with 2 to 8 carbon atoms, and optionally comprises one or more branches and/or double bonds) or a salt or an ester thereof.

10 Claims, 2 Drawing Sheets

(56) References Cited

U.S. PATENT DOCUMENTS

| | | | |
|---|---|---|---|
| 2012/0172623 | A1 | 7/2012 | Yokoyama |
| 2020/0060100 | A1 | 2/2020 | Ono et al. |

FOREIGN PATENT DOCUMENTS

| | | | |
|---|---|---|---|
| JP | 9-295908 | A | 11/1997 |
| JP | 2001-131006 | A | 5/2001 |
| WO | 2006057446 | A1 | 6/2006 |
| WO | 2008078453 | A1 | 7/2008 |
| WO | 2011/034027 | A1 | 3/2011 |
| WO | 2014088002 | A1 | 6/2014 |
| WO | 2018047918 | A1 | 3/2018 |

OTHER PUBLICATIONS

Anuja et al, 12-Oxo-Phytodienoic Acid Accumulation during Seed Development Represses Seed Germination in *Arabidopsis,* 2011, vol. 23, pp. 583-599. (Year: 2011).*

International Search Report, International Application No. PCT/JP2018/009763, dated Jun. 19, 2018, 2 pages.

Machine translation of description of Foreign Document Cite No. 1 (JP 9-295908), 25 pages.

Machine translation of claims of Foreign Document Cite No. 1 (JP 9-295908), 1 page.

Machine translation of description of Foreign Document Cite No. 2 (JP 2001-131006), 26 pages.

Machine translation of claims of Foreign Document Cite No. 2 (JP 2001-131006), 2 pages.

Translation of the International Preliminary Report on Patentability, application No. PCT/JP2018/009763, dated Sep. 26, 2019, 6 pages.

Extended European Search Report from EP App. No. 18768081.4, dated Aug. 24, 2020 (11 pages).

Office Action from EP App. No. 18768081.4, dated Aug. 27, 2021 (9 pages).

Office Action from Japanese Patent Application No. 2019-506048 and English Translation, dated Jun. 12, 2020 (6 pages).

Office Action from Chinese Patent Application No. 201880018032.0 and English Translation, dated Aug. 4, 2020 (19 pages).

Office Action from Indian Patent App. No. 201937038113, dated Apr. 27, 2020 (5 pages).

Ohno et al., "Approach of Plant Responses to Plant Disease Control by Bacterial Metabolites of Fatty Acid (BMFA)", Lexture Nos. 3J32p07-3J32p10, http://www.jsbba.or.jp/MeetingofJSBBA/2017/meeting_of_jsbba_2017.html, Mar. 19, 2017 (11 pages).

"Product Information—13-OxoODE, Item No. 38620", Cayman Chemical, Date (1 page).

Prost, et al. "Evaluation of the Antimicrobial Activities of Plant Oxylipins Supports Their Involvement in Defense against Pathogens," 139 Plant Physiology 1902-1913, Dec. 2005 (12 pages).

Wasternack, et al., "Jasmonate Signaling in Plant Stress Responses and Development—Active and Inactive Compounds", 13 New Biotechnology 604-613, Sep. 2016 (10 pages).

Ghanem, et al., "Organ-dependent oxylipin signature in leaves and roots of salinized tomato plants (*Solanum lycopersicum*)", 169 J. Plant Physiology 1090-1101, 2012 (12 pages).

Dix, et al. "Conversion of Linoelic Acid Hydroperoxide to Hydroxy, Keto, Epoxyhydroxy, and Trihydroxy Fatty Acids by Hematin," 260 J. Biological Chemistry 5351-5357, May 1985 (7 pages).

Ho et al., "A Single Locus Leads to Resistance of *Arabidopsis thaliana* to Bacterial Wilt Caused by Ralstonia solanacearum Through a Hypersensitive-like Response," 89 Phytopathology 673-678, Apr. 1999 (6 pages).

Office Action from Japanese Patent Application No. 2019-506048 and English Translation, dated Jun. 23, 2020 (6 pages).

Office Action from Chinese Patent Application No. 201880018032.0 and English Translation, dated Dec. 31, 2020 (19 pages).

Ohno et al., "Approach of Plant Responses to Plant Disease Control by Bacterial Metabolites of Fatty Acid (BMFA)", Lexture Nos. 3J32p07-3J32p10, http://www.jsbba.or.jp/MeetingofJSBBA/2017/meeting_of_jsbba_2017.html, Mar. 5, 2017 (11 pages).

* cited by examiner

PLANT ACTIVATOR

TECHNICAL FIELD

The present invention relates to a plant activator.

BACKGROUND ART

For the purpose of promoting the plant growth, some measures, such as an optimization of temperature conditions or daylight conditions, or a fertilization, have been implemented for a long time. However, those measures have their limitations. For example, an attempt for increasing an amount of a fertilizer to be used for a fertilization does not accomplish any further desirable growth-promoting effect beyond a certain level, and further, applying too much fertilizer would cause a plant growth disorder and may result in a contamination of the soil.

Therefore, in addition to those measures, there has been some reports regarding a method for activating plants using a plant activator which has a plant growth control activity such as growth promotion, sleep suppression and stress resistance. For example, Reference 1 describes a flower budding induction agent comprising an α-ketol unsaturated fatty acid as an active ingredient. Reference 2 describes a plant activator comprising a ketol fatty acid with 4 to 24 carbon atoms as an active ingredient. Reference 3 describes a plant growth regulator comprising an α-ketol fatty acid derivative as an active ingredient.

Meanwhile, the plant disease and insect pest control depends largely on synthesized agrochemicals, however, in view of the soil contamination as well as human health damage, reducing the amount of the agrochemical to be used has been required. Further, the development of drug-resistant bacteria from excessive spraying of pesticides has been an issue. Several measures including a use of a resistance inducing agent are known which does not show direct antibacterial activity but can induce a disease resistance in the plant. A disease resistance inducing agent including, for example, probenazole, isotianil, acibenzolar-S-methyl (ASM), and 3'-chloro-4,4'-dimethyl-1,2,3-thiadiazole-5-carboxianilide (tiadinil), has been produced. These resistance inducing agents are salicylic acid analogs and activate a salicylic acid mediated signaling pathway in the plant, which leads to an induction of the systemic acquired resistance that is triggered by the elicitors such as pathogenic bacteria or viruses and activated through the salicylic acid. While Validamycin is a microorganism-controlling agent that is capable of reducing a bacterial growth by depleting energy source of pathogenic bacteria through trehalase activity inhibition, it has been reported to induce systemic acquired resistance against the pathogens that cause wilting diseases.

PRIOR ART DOCUMENT

Patent Document

Patent Document 1: JP H9-295908 A
Patent Document 2: JP 2001-131006 A
Patent Document 3: WO 2011/034027

SUMMERY OF THE INVENTION

Problem to be Solved by the Invention

The effect of the plant activators including ketol fatty acids disclosed in Patent Documents 1 to 3 is still not enough. Also, the conventional resistance-inducing agents are chemically synthesized, so that their toxicities are extremely high. Further, Validamycin has been reported to be effective against wilt disease in solanaceous plants, however, the use of Validamycin in tomatoes has the problem that it could cause phytotoxic damage, and thus it should not be used for tomatoes. Other synthetic resistance-inducing agents also tend to cause phytotoxic damage, and the expression of resistance genes as well as the impartation of resistance is not enough. The plant activator having less environmental load and better activation effect including the inducible expression of resistance is in need.

It has been known that the fatty acid oxide including a peroxylipid exhibits antibacterial activity. It has also been known that a tomato derived oxo fatty acid, 13-oxo-9,11-octadecadienoic acid, has a strong agonist activity to activate a transcription factor PPARα (peroxisome proliferator-activated receptor α) that regulates various genes associated with lipid metabolisms and is a potent agent that can improve lipid metabolism disorder such as hypertriglyceridemia and fatty liver. However, it is not known that the oxo fatty acid has an activity as a plant activator.

It is the intention of the present invention to provide a plant activator having superior resistance-inducing activity as well as low toxicity and soil contamination.

Means to Solve the Problem

The present invention relates to a plant activator comprising, as an active ingredient, an oxo fatty acid derivative of general formula (I):

$$HOOC—(R^1)—C{=}C—C({=}O)—R^2 \quad (I)$$

wherein $R^1$ is a straight or branched alkylene group with 6 to 12 carbon atoms, and optionally comprises one or more double bonds, $R^2$ is an alkyl group with 2 to 8 carbon atoms, and optionally comprises one or more branches and/or double bonds or a salt or an ester thereof.

It may be preferable for the plant activator that $R^1$ of the oxo fatty acid derivative is an alkaline group with 8 to 10 carbon atoms, and $R^2$ of the oxo fatty acid derivative is an alkyl group with 4 to 6 carbon atoms.

It may be preferable for the plant activator that the $R^1$ of the oxo fatty acid derivative comprises a double bond, the double bond forming a conjugated double bond with a double bond between an alpha carbon relative to a carbonyl group in general formula (I) and a beta carbon relative to the carbonyl group in general formula (I).

It may be preferable for the plant activator that $R^1$ of the oxo fatty acid derivative is an alkylene group with 9 carbon atoms, and $R^2$ of the oxo fatty acid derivative is an alkyl group with 5 carbon atoms.

It may be preferable for the plant activator that the oxo fatty acid derivative is (9Z,11E)-13-oxo-9,11-octadecadienoic acid or a salt thereof.

It may be preferable for the plant activator that the oxo fatty acid derivative is (9Z,11E)-13-oxo-9,11-octadecadienoic acid.

It may be preferable for the plant activator that the plant activator further comprises 12-oxo-phytodienoic acid or a salt thereof.

It may be preferable for the plant activator that the plant activator further comprises a surfactant and/or a diluent or a carrier.

It may be preferable for the plant activator that a concentration of the oxo fatty acid derivative or the salt or the ester thereof is 0.012 to 0.12 g/L.

It may be preferable for the plant activator that a concentration of 12-oxo-phytodienoic acid or the salt thereof is 0.012 to 0.12 g/L.

It may be preferable that the plant activator is a plant activator to be used as a spraying agent or an immersion agent for contacting with plant stems, leaves, or roots, or a soil injection agent.

It may be preferable that the plant activator is a plant activator to be applied to *Arabidopsis thaliana* plants.

Effects of the Invention

The plant activator of the present invention is easily degradable in the environment, thus providing low toxicity and low soil contamination, and has superior resistance-inducing activity.

EMBODIMENT FOR CARRYING OUT THE INVENTION

Plant activator

Figure 1:
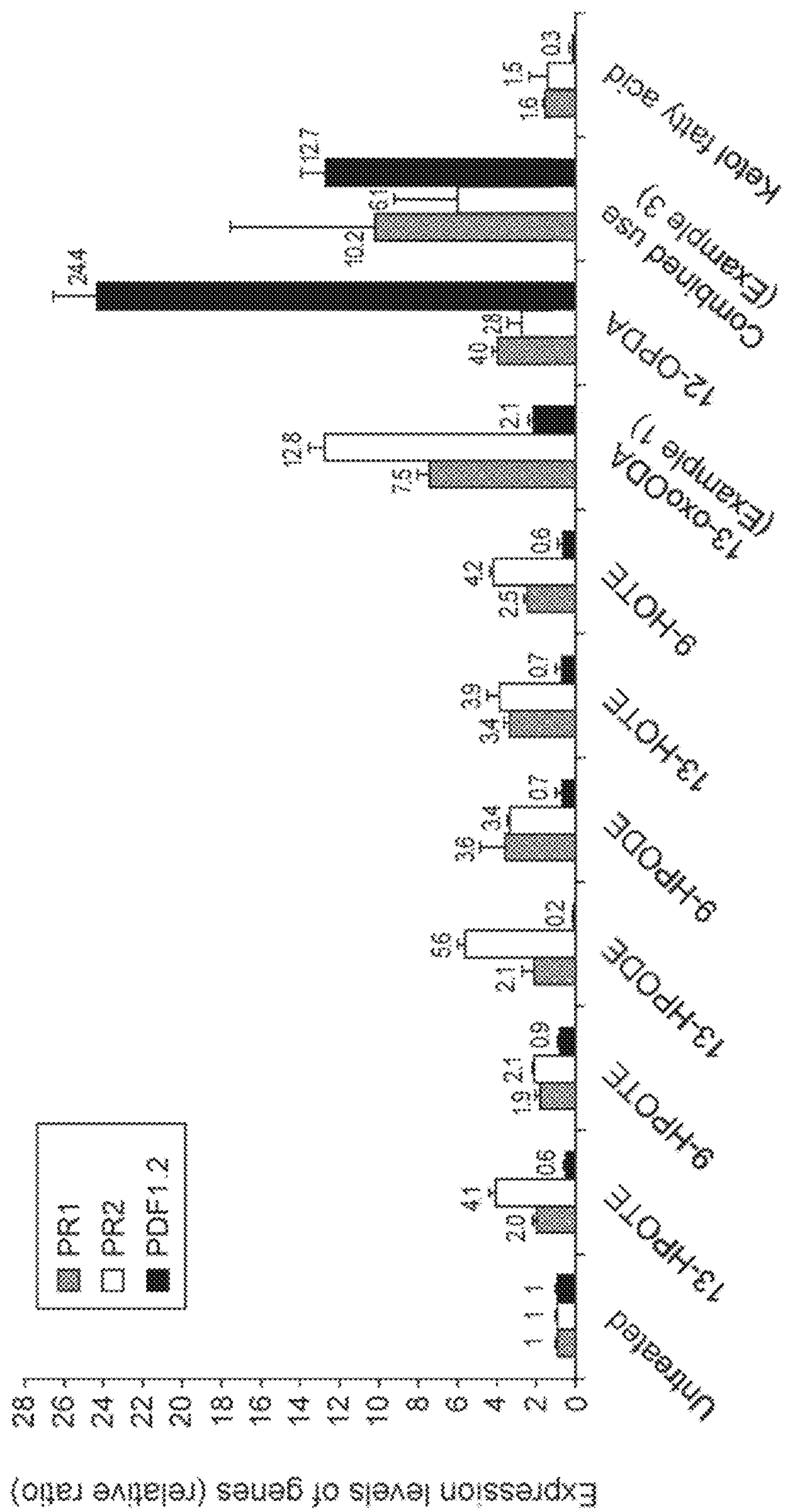
FIG. 1 is a graph showing expression levels of resistance genes.

A plant activator of the present invention is characterized in that it includes, as an active ingredient, an oxo fatty acid derivative of general formula (I):

$$HOOC—(R^1)—C{=}C—C({=}O)—R^2 \quad (I)$$

(wherein $R^1$ is a straight or branched alkylene group with 6 to 12 carbon atoms, and optionally comprises one or more double bonds, $R^2$ is an alkyl group with 2 to 8 carbon atoms, and optionally comprises one or more branches and/or double bonds)

or a salt or an ester thereof. Further, the present invention relates to a plant activator including, as an active ingredient, a compound of general formula (I) including all geometrical isomers and stereoisomers thereof, or a salt or an ester thereof.

Throughout the specification and the corresponding claims "plant activation" refers to adjusting the plant growth activity to being activated or maintained in one way or another and is related to the concept including a plant growth control activity such as growth promotion (which refers to the concept that includes an enlargement of leaves and stems, and a growth promotion of tubers and tuberous roots), sleep suppression, inducing and imparting a stress resistance to plant, and anti-aging. For example, a plant activator of the present invention can render resistance to plants by being contacted to a part of plant leaves and stems or roots. The plant activator of the present invention may induce systemic resistance via a salicylic acid mediated signaling pathway, given that an increase in the expression of resistance genes, PR1 and PR2, can been seen in the plant which is inoculated with the plant activator of the present invention. Using the plant activator of the present invention may promote a development of plant organs and substance production in the plant associated with the plant resistance to the disease or insect pests. The resistance-inducing effect of the plant activator of the present invention is significantly high, and thus, resulting in a superior disease inhibitory effect.

An oxo fatty acid is one of the rare fatty acids that are known to be produced as an intermediate from unsaturated fatty acids metabolism. 13-Oxo-9,11-octadecadienoic acid, which is used in the present invention as an exemplary example of the oxo fatty acid derivatives, is one of the metabolites from linoleic acid oxidative metabolism. Linoleic acid is converted to a lipid peroxide (hydroperoxyoctadecadienoic acid (HPODE)) by enzymatic oxidation via lipoxygenase, which is one of the linoleic acid-metabolic enzymes, or nonenzymatically by an oxidation mechanism mediated by a free radical produced by oxidative stress, and the lipid peroxide (HPODE) is then converted to hydroxyoctadecadienoic acid (HODE) by, for example, peroxidase. Oxooctadecadienoic acid is produced by, for example, hydroxy-fatty-acid dehydrogenase from hydroxyoctadecadienoic acid (HODE). Oxooctadecadienoic acid is also produced from the lipid peroxide (HPODE) by the action of allene oxide synthase and then fatty acid hydroperoxide lyase via epoxy octadecadienoic acid.

Linoleic acid can be converted also by fatty acid desaturase to linolenic acid. Linolenic acid is converted to a lipid peroxide (hydroperoxy octadecatrienoic acid (HPOTE)) by lipoxygenase, and the lipid peroxide (HPOTE) is then converted to 12/10-oxo-phytodienoic acid (12/10-OPDA), a precursor of jasmonic acid, by the action of allene oxide synthase and then allene oxide cyclase via an allene oxide, epoxy octadecatrienoic acid. A ketol fatty acid is also produced from epoxy octadecatrienoic acid by lipoxygenase. The lipid peroxide (HPOTE) is also converted to a conjugated lipid oxide, hydroxy octadecatrienoic acid (HOTE) by reductase.

As described below, the significant effect on the expression of resistance-inducing traits of the plant activator of the present invention is not obtained when the aforementioned lipid peroxides (HPODE, HPOTE) or conjugated lipid oxide (HOTE) is used instead of the oxo fatty acid. Especially considering that the lipid peroxide (13-HPOTE), which is a precursor of 13-oxo-9,11-octadecadienoic acid, does not provide any resistance-inducing effect the plant activator of the present invention has, it is appreciated that a significant resistance-inducing effect according to the plant activator of the present invention is an effect specific to the oxo fatty acid.

Further, the precursor of jasmonic acid, 12/10-OPDA, which is generally known as a compound that induces an expression of resistance genes associated with a jasmonate mediated signaling pathway, the conjugated lipid oxide HOTE, which has been reported as a compound that induces an expression of resistance genes associated with a salicylic acid mediated signaling pathway in induction of the systemic resistance, and the ketol fatty acid are, as described above, all fatty acid analogs synthesized from linolenic acid, which is produced from linoleic acid. On the other hand, 13-oxo-9,11-octadecadienoic acid which can be used in the context of the present invention is a compound that is produced directly from linoleic acid, and not via linolenic acid. In this context, it can be realized that the resistance-inducing effect of 13-oxo-9,11-octadecadienoic acid according to the invention is attained for the first time by focusing the novel metabolic pathway of linoleic acid as a target for obtaining a better induction of resistance.

13-Oxo-9,11-octadecadienoic acid used in the context of the present invention is a naturally occurring metabolite which may be obtained by linoleic acid metabolism. Thus, the plant activator of the present invention designed to use a naturally occurring metabolite may be in accordance with the metabolic pathway in the plant, thereby an expression of the function could be facilitated. Furthermore, the plant activator of the present invention may be easily degradable in the environment after being applied, the possibility of soil contamination or toxicity should be low.

The plant activator of the present invention induces systemic resistance in the plant via a salicylic acid mediated signaling pathway, resulting in the suppression of plant disease. The plant activator of the present invention may be used together with other resistance-inducing agents. For example, the plant activator of the present invention may be applied to the plant in the presence of the precursor of jasmonic acid, 12/10-OPDA, which can induce the expression of resistance genes associated with the jasmonate mediated signaling pathway. In this context, both salicylic acid mediated signaling pathway and jasmonate mediated signaling pathway may be activated mutually complementary, enabling an induction of higher resistance in the plant. The supplementary used resistance-inducing agents, including a precursor of jasmonic acid, may be used at a concentration similar to that used for the plant activator of the present invention or a salt or an ester thereof, together with the plant activator of the present invention or a salt or an ester thereof.

With the context of the present invention the plant activator may include a surfactant and/or diluent or carrier having a compatibility suitable for use in the plant activator when necessary. For example, the diluent may increase a dispersibility of 13-oxo-9,11-octadecadienoic acid or a salt or an ester thereof. Further, the surfactant such as dispersion auxiliary agent or wetting agent, for example, may be included in the plant activator in order to increase a solubility or dispersibility of the oxo fatty acid derivative which can be used in the context of the present invention in a diluent. In this context, the additive component is not particularly limited unless it is an agriculturally acceptable agent. The plant activator of the present invention may further include additional components, which can be generally used for, for example, agrochemical formulations, other than surfactants, diluents or carriers.

In the context of the present invention, the oxo fatty acid derivatives or a salt or an ester thereof may be used in the concentration of 0.12 g/L or less. A preferable concentration of the oxo fatty acid derivatives or a salt or an ester thereof in the context of the present invention may depend on the plant species and conditions to which the plant activator of the present invention is applied, however, the concentration of 0.12 g/L or more may cause phytotoxicity. Although the lower limit of the concentration of the oxo fatty acid derivatives or a salt or an ester thereof in the context of the present invention is not particularly limited, the concentration may preferably be 0.012 g/L or more. The concentration of the oxo fatty acid derivatives or a salt or an ester thereof in the context of the present invention may preferably be from 0.012 to 0.12 g/L.

The plant activator of the present invention only needs to include an oxo fatty acid derivative or a salt or an ester thereof, and the origin of the derivatives is not particularly limited. The oxo fatty acid derivatives or a salt or an ester thereof, including 13-oxo-9,11-octadecadienoic acid, used in the context of the present invention may be obtained by chemical synthesis or microorganism synthesis, or by applying a microorganism-derived enzyme to a substrate such as fatty acid. Especially since 13-oxo-9,11-octadecadienoic acid is highly fat soluble, it may be practically advantageous to alkalize the compound by adding a salt to impart the water solubility in order to facilitate the handling. The salt to be generally used in the context of the present invention includes, but not limited to, ammonium salt and metal salt. The metal salt may be preferably a salt producing a monovalent metal ion, more preferably a lithium salt, sodium salt, or potassium salt. The plant activator of the present invention only needs to include a desired concentration of an oxo fatty acid derivative, and in this context, for example, when 13-oxo-9,11-octadecadienoic acid produced by microorganisms is used as an oxo fatty acid derivative, any mixture containing 13-oxo-9,11-octadecadienoic acid may be used for the plant activator of the present invention. When the mixture contains, for example, a biosurfactant which is produced by microorganisms, it may possibly increase a dispersibility of the plant activator of the present invention without adding the aforementioned additive components. Even when the oxo fatty acid derivative itself is insoluble, it may be dispersed in water by being emulsified with biosurfactant.

The plant activator of the present invention may be applied to the plant by any method or process desired. For example, it may be applied as a spraying agent or an immersion agent for contacting with plant stems, leaves, or roots, or a soil injection agent. In the plant to which the plant activator of the present invention is applied, the plant activator induces systemic resistance in the plant via a salicylic acid mediated signaling pathway, resulting in the suppression of plant disease. Further, considering also the fact that 13-oxo-9,11-octadecadienoic acid or the like is a naturally occurring fatty acid oxide, the plant activator of the present invention is advantageous in that it has low environmental load and little or no phytotoxicity to the plant to which the plant activator is applied.

The plant to which the plant activator of the present invention can be applied are not particularly limited, and the plant activator of the present invention may be applied preferably to a wide range of plant varieties. Exemplary examples of plant include for instance a plant of the family Cruciferae.

EXAMPLES

The present invention will be illustrated in detail by way of the Examples below, although the present invention shall be not limited to those specific Examples.

Example 1

Evaluation of the Resistance Gene Expression

As Example 1, 0.15% potassium bicarbonate aqueous solution containing 0.012% of 13-oxo-9,11-octadecadienoic acid was prepared. (9Z,11E)-13-oxo-9,11-octadecadienoic acid (13-oxoODA, Cayman Chemical Company, INC.) was used as a 13-oxo-9,11-octadecadienoic acid. As Comparative Examples, 0.15% potassium bicarbonate aqueous solution containing 0.012% of a fatty acid analog, which is selected from 13-HPODE ((9Z,11E)-13-hydroperoxy-9,11-octadecadienoic acid, Cayman Chemical Company, INC.), 9-HPODE ((10Z,12E)-9-hydroperoxy-10,12-octadecadienoic acid, Cayman Chemical Company, INC.), 9-HPOTE ((10E,12Z,15Z)-9-hydroperoxy-10,12,15-octadecatrienoic acid, Cayman Chemical Company, INC.), 9-HOTE ((10E,12Z,15Z)-9-hydroxy-10,12,15-octadecatrienoic acid, Cayman Chemical Company, INC.), 13-HPOTE ((9Z, 11E, 15Z)-13-hydroperoxy-9,11,15-octadecatrienoic acid, Cayman Chemical Company, INC.), 13-HOTE ((9Z, 11E, 15Z)-13-hydroxy-9,11,15-octadecatrienoic acid, Cayman Chemical Company, INC.) and 12-OPDA (12-oxo-phytodienoic acid, Cayman Chemical Company, INC.), and 0.15% potassium bicarbonate aqueous solution containing 0.012% of an α-ketol fatty acid were prepared. An aqueous solution of α-ketol fatty acid was prepared according to the preparation method described below.

10 mg of soybean lipoxidase (Sigma-Aldrich) was added to the linoleic acid suspension containing 1 g of linoleic acid, 0.15 g of potassium dihydrogenphosphate, and 100 mL of distilled water, and the reaction mixture was stirred for 24 hours to form peroxylipid 1. The formation of peroxylipid was identified by TLC comparison with a standard compound (developing solvent chloroform:methanol, 20:1, using sulfuric acid as coupler) and by the increase in absorbance at 234 nm. Further, it was identified by NMR that the main composition in the peroxylipid 1 was 13-HPODE ((9Z,11E)-13-hydroperoxy-9,11-octadecadienoic acid).

To the resulting peroxylipid 1, 0.1 mg of allene oxide synthase (Sigma-Aldrich) was added and stirred for 24 hours to form α-ketol fatty acid with 18 carbon atoms. The enzyme reaction was then stopped by adding dilute hydrochloric acid on ice to adjust the pH of reaction mixture to 3.0. The solution after whose pH was adjusted to 6.5 was used as α-ketol fatty acid solution.

Example 2

Evaluation of the Resistance Gene Expression

As Example 2, 0.15% dipotassium hydrogenphosphate aqueous solution containing 0.012% of 13-oxo-9,11-octadecadienoic acid was prepared. (9Z,11E)-13-oxo-9,11-octadecadienoic acid (13-oxoODA, Cayman Chemical Company, INC.) was used as a 13-oxo-9,11-octadecadienoic acid. As Comparative Examples, 0.15% dipotassium hydrogenphosphate aqueous solution containing 0.012% of a fatty acid analog, which is selected from 13-HPODE ((9Z,11E)-13-hydroperoxy-9,11-octadecadienoic acid, Cayman Chemical Company, INC.), 9-HPODE ((10Z,12E)-9-hydroperoxy-10,12-octadecadienoic acid, Cayman Chemical Company, INC.), 9-HPOTE ((10E,12Z,15Z)-9-hydroperoxy-10,12,15-octadecatrienoic acid, Cayman Chemical Company, INC.), 9-HOTE ((10E, 12Z, 15Z)-9-hydroxy-10,12,15-octadecatrienoic acid, Cayman Chemical Company, INC.), 13-HPOTE ((9Z, 11E, 15Z)-13-hydroperoxy-9,11,15-octadecatrienoic acid, Cayman Chemical Company, INC.), 13-HOTE ((9Z, 11E, 15Z)-13-hydroxy-9,11,15-octadecatrienoic acid, Cayman Chemical Company, INC.) and 12-OPDA (12-oxo-phytodienoic acid, Cayman Chemical Company, INC.), and 0.15% dipotassium hydrogenphosphate aqueous solution containing 0.012% of an α-ketol fatty acid were prepared. An aqueous solution of α-ketol fatty acid was prepared according to the preparation method similar to Example 1.

Each of the aqueous solutions obtained from Examples 1 and 2 was applied using the watering to treat only the roots (underground part) of *Arabidopsis thaliana* plants grown in the soil. The total RNA was isolated 24 hours after treatment from each *Arabidopsis thaliana* plant treated with each of the aqueous solutions and from the untreated *Arabidopsis thaliana* plant as a control, and the cDNA was synthesized from the isolated total RNA, and then the expression levels of resistance genes, PR1, PR2 and PDF1.2 were analyzed by real-time PCR. The gene expression levels were respectively normalized using the house keeping gene as negative control. The results are shown in FIG. 1 (Example 1) and FIG. 2 (Example 2).

Figure 2:
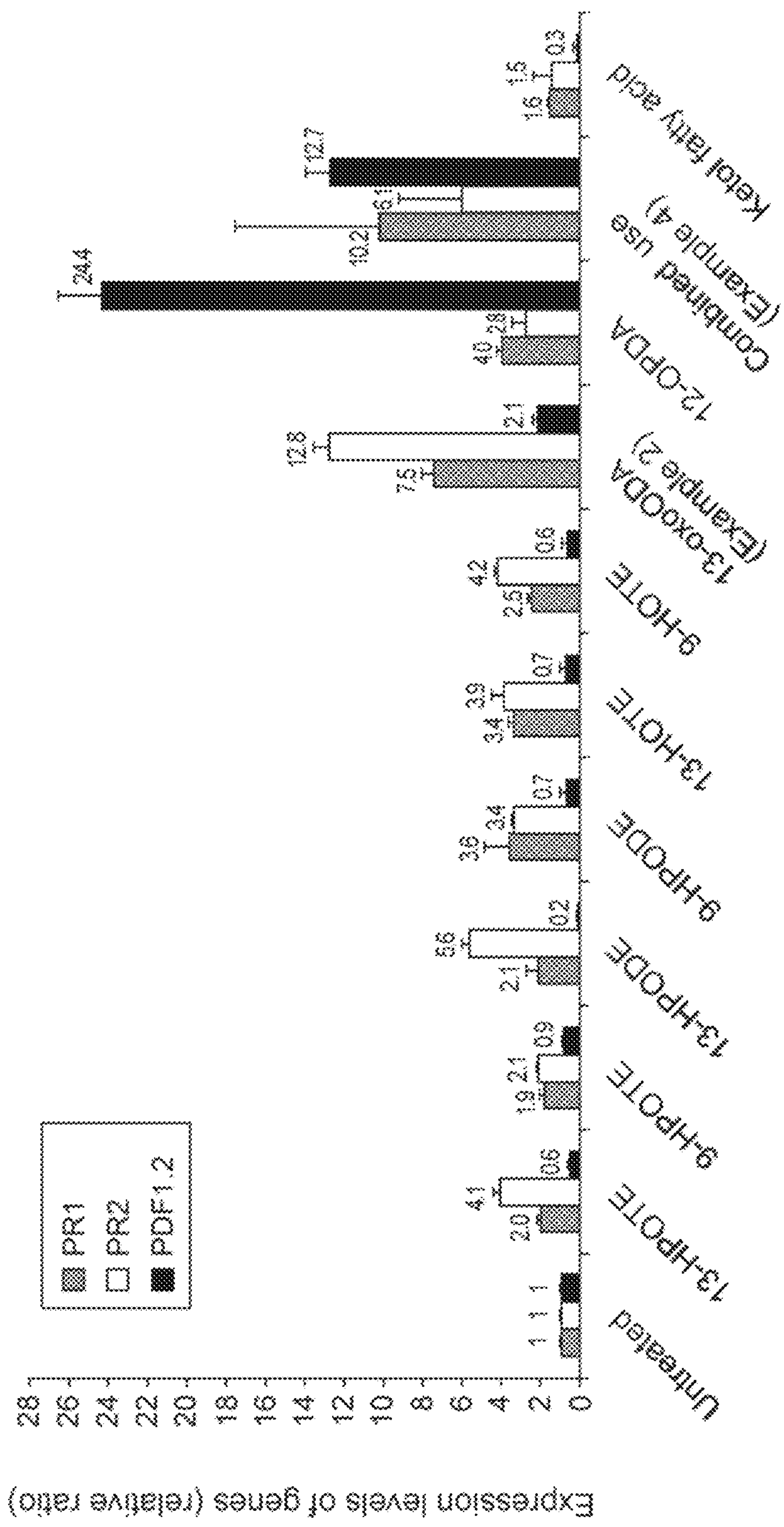
FIG. 2 is a graph showing expression levels of resistance genes.

It should be appreciated from FIG. 1 and FIG. 2 that 13-oxoODA can induce significantly higher expressions of PR1 and PR2 genes that regulate the resistance against the pathogenic bacteria (salicylate metabolism system) compared to other substances. On the other hand, 12-OPDA induced the expression of PDF1.2 gene that regulates the resistance against insect pests (jasmonic acid metabolism system) compared to other substances.

Example 3

Effect by Combined Use on the Resistance Gene Expression 0.15% potassium bicarbonate aqueous solution containing both 0.012% of (9Z,11E)-13-oxo-9,11-octadecadienoic acid (13-oxoODA, Cayman Chemical Company, INC.) and 0.012% of a fatty acid analog 12-OPDA (12-oxo-phytodienoic acid, Cayman Chemical Company, INC.) was prepared.

Example 4

Effect by Combined Use on the Resistance Gene Expression 0.15% dipotassium hydrogenphosphate aqueous solution containing both 0.012% of (9Z,11E)-13-oxo-9,11-octadecadienoic acid (13-oxoODA, Cayman Chemical Company, INC.) and 0.012% of a fatty acid analog 12-OPDA (12-oxo-phytodienoic acid, Cayman Chemical Company, INC.) was prepared.

*Arabidopsis thaliana* plants were treated using the prepared aqueous solutions similar to Examples 1 and 2, and the total RNA was isolated and the cDNA was synthesized from the isolated total RNA. The expression levels of the resistance genes, PR1, PR2 and PDF1.2 were examined by the similar method described in Examples 1 and 2. The results are shown in FIG. 1 (Example 3) and FIG. 2 (Example 4).

The mixed composition of 13-oxoODA and 12-OPDA was able to express both PR1 and PDF1.2 genes simultaneously, suggesting that the mixed composition of both compounds enables to activate the salicylic acid and jasmonic acid pathways mutually complementary. Since the potassium salt was added to a series of aqueous solutions used for the evaluation in Examples 1 to 4 in order to increase the water solubility of 13-oxoODA and 12-OPDA, it should be appreciated that a part of the composition exists as the potassium salts of those compounds.

The above described results show that the plant activator of the present invention has a superior resistance-inducing activity and low toxicity and soil contamination.

The invention claimed is:

1. A method for producing a plant activating effect in a plant, the method comprising:

treating the plant with a solution by contacting the solution with plant stems, leaves, or roots, or irrigating the solution into a soil, the solution being an aqueous solution comprising a metal salt and an oxo fatty acid derivative of general formula (I), or a salt or an ester thereof, wherein general formula (I) is:

$$HOOC—(R^1)—C{=}C—C({=}O)—R^2 \qquad (I)$$

wherein $R^1$ is a straight alkylene group with 6 to 12 carbon atoms, and comprises one or more double bonds, and $R^2$ is an alkyl group with 2 to 8 carbon atoms, and optionally comprises one or more branches and/or double bonds.

2. The method of claim 1, wherein $R^1$ of the oxo fatty acid derivative is an alkylene group with 8 to 10 carbon atoms, and $R^2$ of the oxo fatty acid derivative is an alkyl group with 4 to 6 carbon atoms.

3. The method of claim 1, wherein $R^1$ of the oxo fatty acid derivative comprises a double bond, the double bond forming a conjugated double bond with a double bond between an alpha carbon relative to a carbonyl group in general formula (I) and a beta carbon relative to the carbonyl group in general formula (I).

4. The method of claim 1, wherein $R^1$ of the oxo fatty acid derivative is an alkylene group with 9 carbon atoms, and $R^2$ of the oxo fatty acid derivative is an alkyl group with 5 carbon atoms.

5. The method of claim 1, wherein the oxo fatty acid derivative is (9Z, 11E)-13-oxo-9,11-octadecadienoic acid or a salt thereof.

6. The method of claim 1, wherein the oxo fatty acid derivative is (9Z, 11E)-13-oxo-9,11-octadecadienoic acid.

7. The method of claim 1, wherein the solution further comprises a surfactant and/or a diluent or a carrier.

8. The method of claim 1, wherein the plant is applied to *Arabidopsis thaliana*.

9. The method of claim 1, wherein the metal salt forms a monovalent metal ion.

10. The method of claim 1, wherein the metal salt is a potassium salt.

* * * * *